April 16, 1957    H. J. M. FORSTER    2,788,874
SYNCHRONIZING MECHANISM
Filed Nov. 21, 1955

INVENTOR
HANS-JOACHIM M. FÖRSTER

BY Dicke and Craig

ATTORNEYS

United States Patent Office 2,788,874
Patented Apr. 16, 1957

2,788,874

SYNCHRONIZING MECHANISM

Hans Joachim M. Forster, Stuttgart-Bad Cannstatt, Germany, assignor to Daimler-Benz Aktiengesellschaft, Stuttgart-Unterturkheim, Germany Application November 21, 1955, Serial No. 548,176

Claims priority, application Germany November 23, 1954

7 Claims. (Cl. 192—53)

The present invention relates to improvements in clutches for engaging the gears of motor vehicles.

More particularly the invention relates to improvements in synchronizing mechanism, especially for synchronizing the movement of the members of a jaw clutch of the type which includes a control element for preventing the clutch members from engaging each other when running at uneven speeds. Such control element is connected to one clutch member so as to permit a certain limited rotary movement relative thereto, and is engageable with the other clutch member by means of a friction clutch so that suitable blocking elements will thereby be interposed between the two clutch members to prevent them from being engaged with each other. These blocking elements are preferably provided with inclined surfaces which extend at an acute angle relative to the axis of the clutch, while the friction clutch is preferably of the conical type.

In synchronizing mechanism of this known type the difficulty often occurs that, after the clutch members have been synchronized, a certain separating resistance has to be overcome in order to turn the control element, and particularly if for producing the frictional connection between the control element and the respective clutch member a friction cone is used, the angle of which is similar to that required to produce the necessary friction.

It is an object of the present invention to provide suitable means for overcoming this disadvantage of jaw clutches according to previous design.

A feature of the invention for attaining this object consists in connecting one of the clutch members of the friction clutch, and especially one of the conical type, so as to permit a limited rotary movement thereof in a peripheral direction against the action of a spring relative to the respective part associated therewith, i. e. relative to the control element or to the other clutch member.

Another feature of the invention consists in providing such limited rotary movement in both directions of rotation from a central position, and in making the springs for this purpose of just the proper strength so that they will return the friction clutch member to the central position after the jaw clutch has been synchronized.

Another object and feature of the present invention consists in designing the clutch so that the respective clutch member may yield in a peripheral direction relative to the respective associated part to a degree which is substantially equal to that of one-half of the pitch of the jaw clutch to be synchronized.

Further objects, features, and advantages of the present invention will be apparent from the following detailed description thereof and from the accompanying drawings, in which:

Fig. 2 shows a cross section taken along line 2—2 of Fig. 1; while

Figure 1:
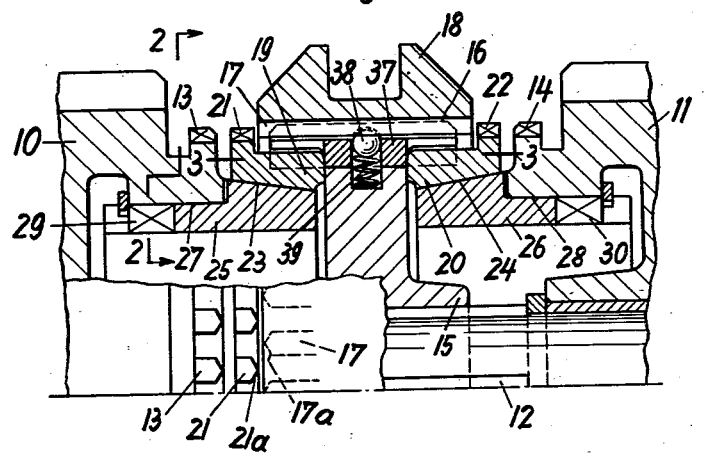
Fig. 1 shows a longitudinal section through the synchronizing mechanism according to the invention.
Figure 3:
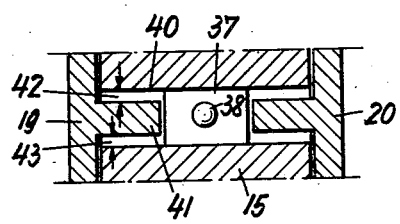
Fig. 3 shows a section taken along line 3—3 of Fig. 1.

Referring to the drawings, a gear 10 of a gear system as usually provided in motor vehicles for driving the same is rigidly mounted, for example, on a driven shaft 12. Both gears 10 and 11 are provided with jaws 13 and 14, respectively, which serve as clutch members. A central hub member 15 is enclosed on both sides by jaw teeth 13 and 14 and rigidly secured to shaft 12. Hub member 15 carries a collar 18 which serves as a clutch member and is mounted thereon by means of interengaging keys or teeth 16, 17 so as to be axially slidable in one or the other direction. Teeth 16 are designed so as to correspond to the jaw teeth 13 and 14 which operate as outer clutch members.

Figure 2:
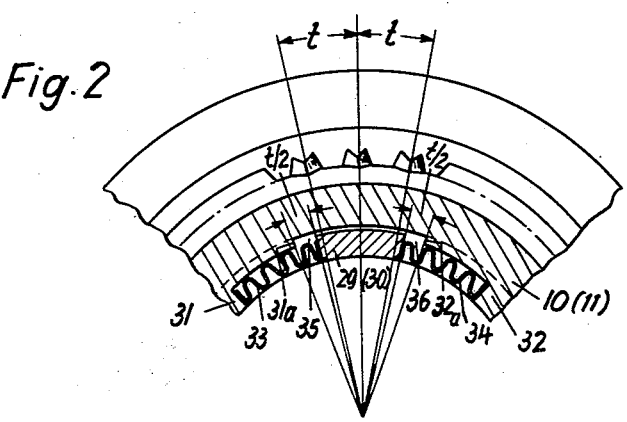

Synchronizing rings 19 and 20 are interposed between the central clutch member 18 and the outer clutch members 13 and 14, respectively, and are each provided with teeth 21 or 22 for locking the clutch members in engaged position. Rings 19 and 20 are provided with conical surfaces 23 and 24, respectively, which are adapted to be engaged with similar surfaces on a pair of intermediate rings 25 and 26 which are inserted into cylindrical surfaces 27 and 28 on gears 10 and 11, respectively, which carry jaws 13 and 14. Intermediate rings 25 and 26 are provided with jaws 29 and 30, respectively, which loosely engage with corresponding jawlike projections 31 and 32 on gears 10 and 11 so as to have a certain intermediate play 35, 36. As shown particularly in Fig. 2, gears 10 and 11 are further provided with suitable recesses within which springs 33 and 34 are mounted intermediate jaws 29 and 30 and the adjacent projections 31 and 32 so that jaws 29 and 30 on rings 25, 26 are able to move resiliently in either direction relative to gears 10 and 11 to the extent of the play 35 or 36 until they engage with the sides 31a or 32a of jaws 31 or 32, respectively.

Teeth 17 on central clutch member 18, as well as teeth 21 on synchronizing ring 19 are inclined at their opposite ends, as indicated at 17a and 21a in Fig. 1. If desired, jaws 13 and 14 may be similarly inclined.

Rings 19 and 20 are connected with hub member 15 so as to be rotatable to a limited extent in a peripheral direction relative thereto and thus also relative to the slidable collar 18. For this purpose, hub member 15 is provided with a series of recesses 40 which are uniformly distributed along its periphery and in each of which a pressure block 37 is mounted so as to be movable in an axial direction. Each pressure block 37 carries a steel ball 38 which engages in a recess in central clutch member 18 under the action of a spring 39. Rings 19 and 20 further carry projections 41 which loosely engage in a peripheral direction with a certain play 42 and 43 in recesses 40 of hub member 15 but are otherwise taken along by the latter in its direction of rotation.

Rings 19 and 20 are preferably movable in one or the other direction relative to hub member 15 by one-half (t/2) of the pitch of teeth 16, 17, or 21, 22 or 13, 14. The intermediate rings 25, 26 are preferably likewise rotatable to a similar extent between gears 10 and 11, respectively.

When in its neutral central position clutch member 18 is out of engagement with the intermediate locking jaws 21, 22 and jaws 13 and 14. Gears 10 and 11 are thus disengaged from shaft 12. For engaging one of the gears with shaft 12, slide collar 18 is shifted toward one or the other direction. Thus, for example, if gear 10 is to be engaged, collar 18 will be shifted toward the left. In so doing, pressure blocks 37 force ring 19 against intermediate ring 25 so that it will be taken along by gear 10 by the conical surface 23 engaging with ring 25. Depending upon the direction of relative rotation between gear 10 and shaft 12, ring 19 will then be turned in one or the other direction relative to hub member 15 and thus also relative to collar 18 by a distance t/2. Jaw teeth 21 on ring 19 are thereby turned relative to teeth 16, 17 from the position illustrated in the drawings to such an extent that when collar 18 is further shifted toward the left, teeth 17 abut against teeth 21. The torsional moment occurring between between member 19, 21 and collar 18 consequently prevents teeth 17 from engaging until the synchronizing action of member 19, 21 on friction surface 23 has adapted the speed of gear 10 to that of shaft 12, at which time member 19, 21 may normally be turned back to the position shown in Fig. 1 by the axial pressure of collar 18 exerted by the inclined surfaces 17a and 21a.

Such returning movement is, however, opposed by the friction on the conical surface 23. If such friction is stronger than the engaging pressure exerted by teeth 17 upon teeth 21, and collar 18 is further shifted, member 19, 21 may then be turned back despite such friction by the fact that the relatively strong springs 33 or 34 will be compressed in one or the other direction of rotation to the extent of the play 35 or 36.

After member 18 has been shifted completely and clutch members 15 and 10 have thereby been engaged, intermediate ring 25 can again return to its central position relative to gear 10 by the action of the strong springs 33 or 34. Suitable steps may also be provided to prevent the springs from relaxing beyond the central position and for maintaining them under tension so as to prevent the intermediate ring 25 or 26 from oscillating.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In combination with a jaw clutch comprising a pair of rotatable members for engaging the gears of a variable gear transmission, synchronizing means including a locking member having blocking means for preventing the clutch members from engaging each other when running at uneven speeds, means for connecting said locking member with the first of said clutch members so as to permit a limited rotary movement of said locking member relative to said first clutch member, a friction clutch for connecting said locking member with the second clutch member and for thereby interposing said blocking means between said clutch members, said blocking means having axially inclined surfaces, one part of said friction clutch being connected to said locking member and having a limited peripheral play relative to said second clutch member, and spring means for permitting a limited peripheral movement of said part within the distance of said play.

2. In a combination as defined in claim 1, wherein said spring-connected part of said friction clutch is directly connected to one of said clutch members so as to permit a limited rotary movement thereof.

3. In a combination as defined in claim 2, wherein said spring-connected part of said friction clutch is connected to one of said clutch members so as to permit a limited rotary movement thereof in both directions of rotation.

4. In a combination as defined in claim 3, wherein said spring-connected part of said friction clutch is mounted so as to be movable from a central position in either direction by a distance substantially equal to at least one-half of the pitch of the teeth of the jaw clutch.

5. In a combination as defined in claim 3, wherein said spring means tend to maintain said part of said friction clutch in a central position relative to said second clutch member and are of a strength so as to return said part to said central position after the synchronization has been completed.

6. In a combination as defined in claim 1, wherein said spring-connected part of said friction clutch is connected with said second clutch member by means of jaw members, and wherein said spring means comprise a pair of springs on either side of the jaws of said part and said second clutch member for maintaining said part in a central position relative to said second clutch member.

7. In a combination as defined in claim 1, wherein said blocking means on said locking member are in the form of teeth whereby when said clutch members are synchronized, the jaw members of one of said clutch members are adapted to engage between said teeth.

No references cited.